United States Patent [19]

Zweegers

[11] 4,048,790

[45] Sept. 20, 1977

[54] AGRICULTURAL IMPLEMENTS

[76] Inventor: Petrus Wilhelmus Zweegers, Nieuwendijk 46, Geldrop, Netherlands

[21] Appl. No.: 475,255

[22] Filed: May 31, 1974

[30] Foreign Application Priority Data

June 14, 1973 Netherlands .......................... 7308309

[51] Int. Cl.² .......................................... A01D 35/264
[52] U.S. Cl. ..................................... 56/13.6; 56/15.9; 56/192; 172/311; 280/446 A
[58] Field of Search ................... 56/192, 6, 13.5, 13.6, 56/10.2, 10.4, 15.8, 15.9, 503; 172/311, 456; 280/446 A, 460 A

[56] References Cited

U.S. PATENT DOCUMENTS

| 1,157,098 | 10/1915 | Greene | 64/28 R |
|---|---|---|---|
| 2,773,369 | 12/1956 | Klemm | 64/28 R |
| 2,795,178 | 6/1957 | Silver et al. | 280/446 A |
| 3,070,938 | 1/1963 | Winget | 56/6 |
| 3,443,369 | 5/1969 | Zweegers | 56/192 X |
| 3,500,619 | 3/1970 | Bacon | 56/6 |
| 3,550,360 | 12/1970 | van der Lely | 56/6 |
| 3,619,996 | 11/1971 | Jacobson et al. | 56/13.6 |
| 3,643,976 | 2/1972 | Haupt | 280/460 A |
| 3,717,981 | 2/1973 | van der Lely | 56/192 |

FOREIGN PATENT DOCUMENTS

| 1,906,827 | 9/1969 | Germany | 56/192 |
|---|---|---|---|
| 1,295,908 | 5/1969 | Germany | 56/192 |

Primary Examiner—Jay N. Eskovitz
Attorney, Agent, or Firm—Edmund M. Jaskiewicz

[57] ABSTRACT

An agricultural implement having a transversely extending horizontal frame beam which is composed of pivoted sections. The pivots are located at a substantial spacing under the frame beam sections and connected to the frame beam sections by arms which extend obliquely downwards from the ends of the frame beam sections. The sections may be lifted by hydraulic rams. If the implement is mounted at the front of a tractor via a three point linkage, the lower links of said linkage are slidingly extensible.

12 Claims, 4 Drawing Figures

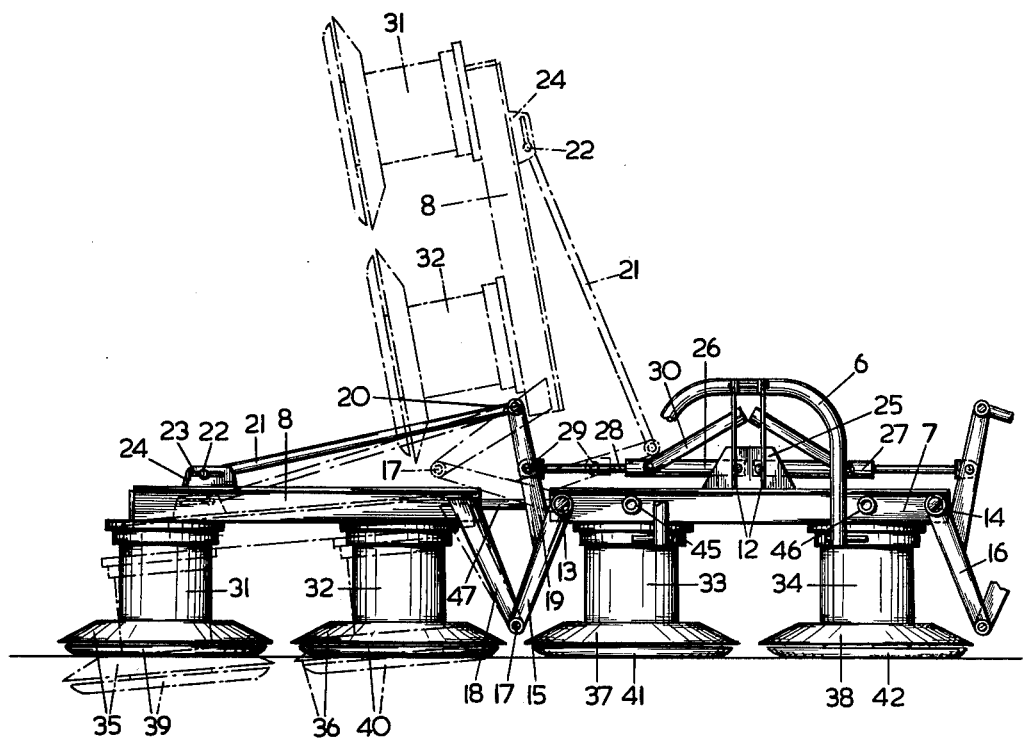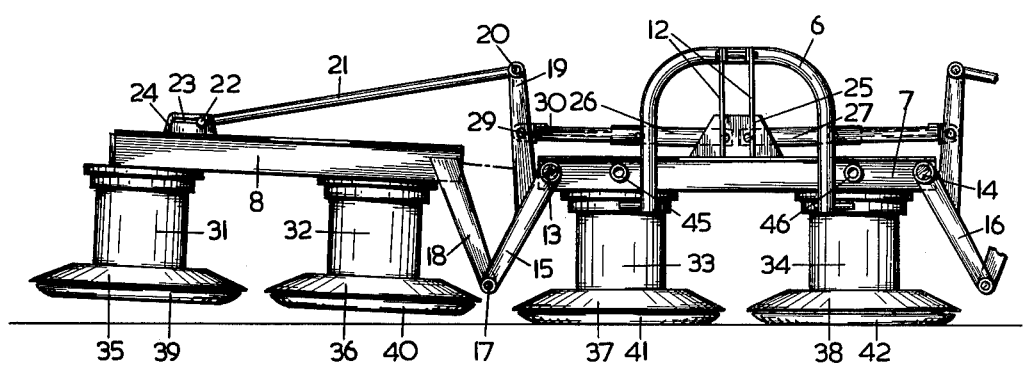

AGRICULTURAL IMPLEMENTS

This invention relates to an agricultural implement having a substantially horizontal frame beam extending transversally to the direction of movement of the implement, said frame beam being composed of sections which are pivotally connected together for mutual vertical pivotal movement and which carry work performing elements such as rotary mowing elements, in which the crop or ground engaging ends of said work performing elements are disposed at a substantial distance from and under said frame beam.

In known agricultural implements of this type, the frame beam sections are connected for vertical pivotal movement by pivots which are provided directly on the ends of the frame beam sections and are thus at the same level as the frame beam. This means that mutual pivotal movements of the frame beam sections change the distance between the crop or ground engaging ends of adjacent work performing elements since these ends are substantially spaced from and under the frame beam. A consequence of this is that when e.g. heavily undulating field is worked, the ends of adjacent work performing elements may have undesired contact with each other which means that e.g. the knives of adjacent rotary mowing elements will hit each other, and on the other hand, the distance between adjacent work performing elements may momentarily increase to such a value that unworked strips remain on the field.

It is an object of the invention to provide an agricultural implement of the kind set forth in which this disadvantage is removed or at least substantially diminished.

This object is attained according to the invention in that the pivotal connections between the frame beam sections are situated substantially at the level of the crop or ground engaging ends of the work performing elements. Preferably, adjacent frame beam sections are connected by arms extending obliquely downward from the adjacent ends of said frame beam sections and being pivotally connected for vertical movement.

By locating the pivots of the frame beam sections substantially at the height of the crop or ground engaging ends of the work performing elements, the spacing between said ends does not or hardly at all vary during mutual pivotal movements of the frame beam sections.

In a preferred embodiment, each frame beam section carries one pair of rotary work performing elements and both elements of said pair rotate toward each other at the front of the implement. When such an implement operates on crop extending over the full width of the implement, each pair of cooperating work performing elements feed the crop to the area midway between said pair, so that in the area midway between the outer work performing elements of two adjacent pairs, which is the area of the pivotal connection of two adjacent frame beam sections, there does not remain any crop so that the downwardly extending pivotarms do not disturb the work performed.

When the work performing elements each comprise a known per se conical, rotary flange carrying knives, and a ground support mounted underneath said flange, the pivot of two adjacent frame beam sections is located in the area between two adjacent flanges in a preferred embodiment of the invention.

In a suitable embodiment, the frame beam is composed of three sections of which the intermediate one may be connected to the three point lifting device of an agricultural tractor. An agricultural implement according to the invention, especially when designed as stated in the preceding sentence, is very suitable to be arranged for connection to the front of an agricultural tractor. For one of the major difficulties in designing an agricultural implement with large working width for front mounting is to obtain a good adjustability of the implement such that it can easily adapt itself to field irregularities and to obstacles, and this difficulty is practically overcome by the just mentioned arrangement.

In a further embodiment of the invention, especially with a frame beam composed of three sections, the outer frame beam sections can be lifted by power devices such as hydraulic rams mounted between said sections and the intermediate frame beam section. In this arrangement, adjacent frame beam sections may be connected by a rotary drive shaft having sections positionable at an angle to each other. Thus, the frame beam sections may, without disturbance of the drive flow, perform adapting movements either because the ground engaging supports of the work performing elements cause mutual pivotal movements of the frame beam sections or because the tractor operates the power devices.

In this arrangement, it is preferable that the obliquely downwardly directed arm attached to the intermediate frame beam section is pivotally connected to said intermediate frame beam section for vertical pivotal movement and is provided with an upstanding part which is engaged on the one hand by the power device and which is connected on the other hand to the outwardly adjacent frame beam section. So as to prevent uncontrolled movements of the downwardly directed arm, which has pivots at both ends, without interfering with the adjusting movements of the outwardly adjacent frame beam section, the angle of movement of the upstanding part is preferably limited in both directions whereas a certain amount of play is present in both directions in the connection of the upstanding part with the outwardly adjacent frame beam section.

So as to enable the use of the power device not only for adjusting movements but also for lifting both outer frame beam sections to a road transport position, the movement of the upstanding part directed toward the central plane of the implement has preferably two different end positions, namely one end position in which the outwardly adjacent frame beam section is lifted just enough to be free from the ground and an other end position in which this frame beam section is lifted to an almost vertical position. When the power device is a hydraulic ram, this may be obtained in a simple way, namely by mounting a pivoting latch to the cylinder of the ram, which latch can be disposed between the cylinder and the head of the piston rod of the ram, so as to obtain the first mentioned position.

So as to obtain that after lifting of the outer frame beam sections, the intermediate frame beam section is also automatically lifted, the power device formed by a hydraulic ram may be so coupled to the hydraulic lifting device of the tractor that after reaching the (first or second) end position of the outer frame beam section, further pressure increase of the hydraulic lifting device of the tractor causes lifting of the intermediate frame beam section.

So as to keep the danger of unequal load of the driving parts at a minimum and to prevent, when one of the work performing elements is jammed, damage to the other work performing elements as far as possible, both work performing elements of the intermediate frame beam sections are preferably coupled by shearing means and are each separately driven by the tractor, whereas each of them drives the further outwardly disposed work performing elements at the same side of the tractor.

Since the usual break away device used with agricultural implements mounted at the rear of the tractor for preventing damage when hitting an obstacle, cannot be used with an implement which is mounted, via a three point lifting device, transversely to the direction of movement at the front of a tractor, it is also an object of the invention to provide a solution for the problem to prevent damage of the implement as far as possible when it hits an obstacle. This is obtained in that the lower arms of the three point lifting device are slidingly extensible. For a three point lifting device is connected to an agricultural implement with one upper and two lower pivots which tolerate, within certain limits, movements in all directions, so that an agricultural implement having the just mentioned feature will, when hitting an obstacle located at one side of its central plane, cant about said upper pivot and about said lower pivot located at the same side as the obstacle, so that the part of the implement hitting the obstacle will move relatively rearwardly and the part of the implement located at the opposite side of the tractor will move relatively forwardly, the lower arm of the three point lifting device at said opposite side being simultaneously slidingly extended. The canting movement about the mentioned pivots also provides the advantage that the plane of rotation of the work performing means is simultaneously canted somewhat forwardly so that the work performing means more easily slide over a low obstacle such as a stone The invention will now be elucidated with reference to the accompanying drawing.

FIG. 1 is a front view of an agricultural implement according to the invention, in an embodiment comprising a three section front mounted rotary mower, in which one (operating) position is shown in full lines and two other possible positions are shown in broken lines.

FIG. 2 is a corresponding view of a fourth position of the front mounted rotary mower.

Figure 3:
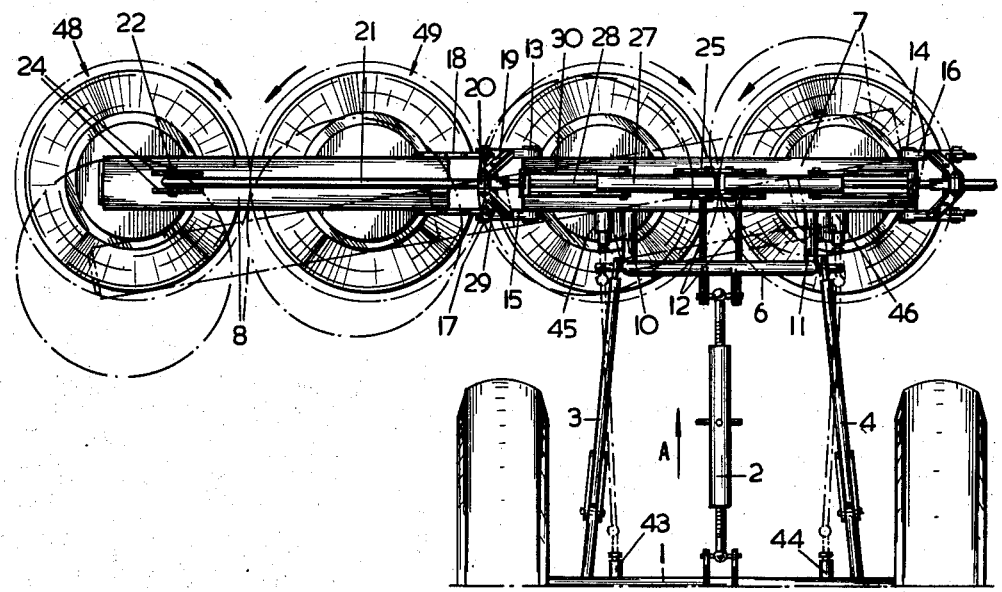
FIG. 3 is a view from above of the front mounted rotary mower, in which one (operating) position is shown in full lines and an other possible position is shown in broken lines.

The front end of a schematically shown agricultural tractor 1 is provided with a coupling device of known type. This device comprises a three point lifting device having an adjustable upper arm 2 and two lower arms 3 and 4 movable up and down by hydraulic rams 5. The free ends of the arms 2, 3, 4 carry a support member 6 in a substantially vertical position. For reasons later to be discussed, the lower arms 3 and 4 are of telescope construction so as to be slidingly extensible as shown in broken lines for the free end of the arm 4 in FIGS. 3 and 4. The force at which extension occurs may e.g., be determined by a snap action device between the two telescoping parts, e.g., in the shape of a spring loaded ball, said force being adjustable e.g., by adjusting the spring pressure of said snap action device.

The vertical support 6 carries the intermediate frame beam section 7 of a three section front mounted rotary mower, said intermediate section being coupled in a way later to be described, with two laterally adjacent outer frame beam sections 8 and 9. The intermediate frame beam section 7 is connected to the support 6 by lower connecting arms 10 and 11 and an upper, double connecting rod 12 extending obliquely upwards from the frame section 7 toward the upper arm 2. Each end of the intermediate frame beam section 7 carries a pivot 13 or 14 respectively and coupled to the relative pivot is an arm 15 or 16 respectively extending obliquely downwards and outwards from the adjacent end of the beam section 7.

In a further description, only the left half of FIGS. 1 and 2 will be described, since it will be clear that the parts at the right of the longitudinal centre plane of FIGS. 1 and 2 are similar to the ones at the left.

The lower end of the downwardly extending arm 15 carries a pivot 17 and coupled to this pivot is an arm 18 extending obliquely downwards from the adjacent end of the left outer frame beam section 8. The arm 18 is rigidly connected to the frame beam section 8. In the normal position of the implement, the three frame beam sections 7, 8 and 9 are aligned. However, they can move vertically with respect to each other because of their pivotal connections. If desired, such movement can be induced by the tractor operator by means of an apparatus to be described below.

An upstanding part 19 is rigidly connected to the arm 15 and the upper end of the part 19 is connected, via a pivot 20, to a rod 21, the other end of which carries a pin 22 which slides in slots 23 of an upstanding double flange 24 mounted on top of the frame beam section 8, near its outer end. The central part of the intermediate frame beam section 7 carries an upstanding double flange 25 to which are pivotally connected two hydraulic rams 26 and 27 which are directed away from each other. The piston rod 28 of the ram 26 is pivotally connected to an intermediate point 29 of the upstanding part 19, which is also of double design so that the head of the piston rod 28 is located between the two sides of the double part 19. The head of the piston rod 28 is connected to the two sides of the double part 19 by a pivot pin 29.

The end of the cylinder of the ram 26 nearest the head of the piston rod 28 carries a latch 30 mounted for upward pivotal movement. FIG. 1 shows the latch 30 in "up" position and FIG. 2 shows the latch 30 in "down" position. In the latter position, the head of the latch 30 is positioned in the line of movement of the head of the piston rod 28 so that the inward movement of the piston rod 28 from its fully extended position is limited to a short length. The length of the latch 30 is so chosen relative to the fully extended position of the piston rod 28 that inward movement of the piston rod 28 in the "down" position of the latch 30 just enables the work performing elements 31, 32 mounted to the outer frame beam section 8 to be lifted clear from the ground.

In this embodiment, the work performing elements 31, 32 mounted to the outer frame beam section 8, as well as the work performing elements 33, 34 mounted to the intermediate frame beam section 7 and the work performing elements (not visible in FIGS. 1 and 2) mounted to the outer frame beam section 9, comprise rotary drums to the lower end of each of which is rigidly connected a conical circumferential flange 35, 36, 37 or 38 respectively, cutters being distributed around each of said flanges and a freely rotatable, saucer shaped ground support 39, 40, 41 or 42 respectively being mounted under each flange 35, 36, 37 or 38 respectively. The successive work performing elements 31, 32, 33, 34 etc. are synchronously but oppositely driven by gearing so that the cutting circles of the cutters attached to the flanges can intermesh without danger of the cutters hitting each other. The work performing elements of the pair 31, 32 rotate toward each other at the front of the implement, which is also true for the elements of the pair 33, 34 and the elements of the third, not shown pair mounted to the frame beam section 9. This means that the two work performing elements adjacent the connection of two connected frame beam sections 7 and 8 or 7 and 9 rotate away from each other at the front of the implement and thus move the crop in opposite directions so that the downwardly directed arms 15, 18 can extend far downwardly in an area in which they do not hinder the work performed by the implement. In the embodiment described, the pivot 17 of the arms 15, 18 is positioned between the adjacent flanges 36, 37 and just a little higher than the level of the cutting circle of the cutters attached to those flanges. This means that when the implement moves over the ground, the two outer frame beam sections 8 and 9 and the work performing elements carried by these sections can adapt itself to an undulating field and possible obstacles on that field without the ensuing vertical pivotal movements of the two outer frame beam sections 8 and 9 causing a substantial change in the distance between the crop or ground engaging ends of the work performing elements adjacent the inner ends of said beam sections. Thus, the field is regularly worked not withstanding the mutual vertical pivotal movements of the frame beam sections.

As described, the mutual vertical pivotal movements of the frame beam sections can be caused by sliding of the ground supports 39, 40, 41, 42 etc. of the work performing elements over an uneven field, but they can also be caused by the tractor driver by operation of the hydraulic rams 26, 27. In both cases, the vertical movement of the outer frame beam sections 8 and 9 is limited by the length of the slot 23 in the upstanding flange 24 (and of the corresponding parts at the other side of the implement) and by the limited movement of the piston rod 28 between its maximum extended position and its maximum retracted position in "down" position of the latch 30. These two end positions are shown in FIG. 1 (namely the lower position shown in broken lines) and in FIG. 2 respectively. However, if the latch 30 is moved into the "up" position (FIG. 1) the piston rod 28 may be fully retracted into the cylinder of the ram 26 so as to lift the outer frame beam section 8 and the work performing elements connected to said section into an almost vertical position shown in broken lines (upper position) in FIG. 1.

The hydraulic rams 26 and 27 may be so coupled to the hydraulic rams 5 of the three point lifting device 2, 3, 4 that after reaching of the upper end position of the frame beam sections 8 and 9 (both in "up" and in "down" position of the latch 30) the rams 5 will come into action when the pressure in the hydraulic system is further increased, so that these rams lift the intermediate frame beam section 7 and the work performing elements carried by this section clear from the ground and the complete implement will be free from the ground.

Figure 4:
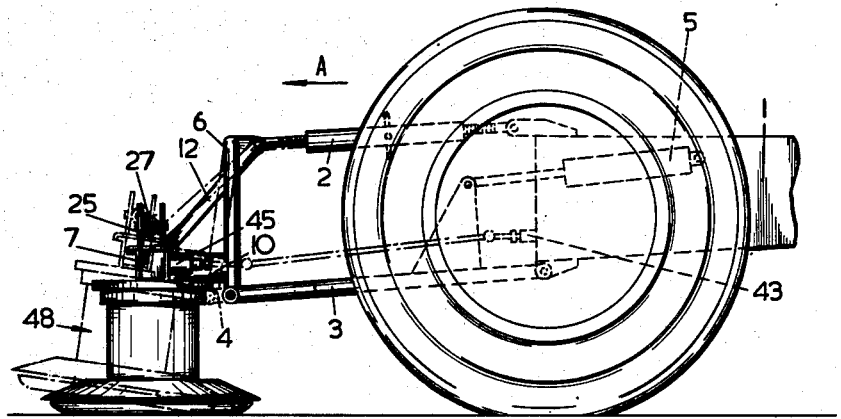
FIG. 4 is a side view of the front mounted rotary mower, in which one (operating) position is shown in full lines and other possible position is shown in broken lines.

The work performing elements 39, 40, 41, 42 etc. are driven by two synchronously rotating power take off shafts 43, 44 at the front of the tractor, which shafts are connected via the usual extensible shafts and universal joints to shafts 45, 46 extending from the intermediate frame beam section 7. A not shown drive shaft extends longitudinally in said frame beam section and comprises a shear-off safety device in the central part of the frame beam section 7, said device e.g. comprising a clutch with claws which are dimensioned to break at a predetermined overload. The shafts 45 and 46 are both coupled by gearing to the not shown longitudinal drive shaft whereas the shafts of the two work performing elements 33, 34 are also coupled to said longitudinal shaft by conical gearing, but so that they rotate oppositely as indicated by arrows in FIG. 3. The direction of movement of the implement as a whole is also shown in FIG. 3 by an Arrow A so that it is visible from this figure that the two work performing elements 33, 34 rotate toward each other at the front of the implement.

The longitudinal drive shaft in the frame beam section 7 protrudes from both ends of said beam section 7 and is there coupled, via universal joints, to corresponding longitudinal drive shafts extending in and protruding from the frame beam sections 8 and 9. FIG. 1 shows the longitudinal drive shaft 47 of the frame beam section 8. The work performing elements 31 and 32 are coupled to the shaft 47 in a manner similar to the coupling of the work performing elements 33 and 34 with the longitudinal shaft of the frame beam section 7 and thus this coupling need not further be described. The universal joints connecting the longitudinal drive shaft in the frame beam section 7 with the longitudinal drive shafts in the frame beam sections 8 and 9 tolerate such an angular movement between said shafts that they do not interfere with the lifting of the outer frame beam sections into the highest end position shown for the section 8 by broken lines in FIG. 1.

As stated, the frame beam section 7, 8, 9 are aligned and substantially horizontal in normal position. In the embodiment described they extend at right angles to the direction of movement of the implement, but it is also possible that the frame beam sections 7, 8, 9 extend in normal position obliquely rearwardly with respect to the direction of movement. Instead of rotary mowing elements, the frame beam sections 7, 8, 9 may carry other ground or crop engaging work performing elements. Each separate work performing element may have its own ground support, but this is not necessary. The work performing elements may also be held at a spacing above the ground by the hydraulic device, or the implement may have ground wheels situtated between the work performing elements. The ends of the work performing elements may rotate according to circles disposed in a plane which is substantially parallel to the ground but they may also rotate in planes which are disposed at an angle to the ground, and they may also perform other movements. The frame beam of the implement may be composed of two, three or more than three sections. It is not necessary that the frame beam sections are alined in normal position, the implement may be so designed that the frame beam sections are disposed at an angle to each other in normal position, either or both in the horizontal and in the vertical plane. The implement is not necessarily a front mounted implement, in fact it is not necessarily a tractor mounted implement, and it is not necessary either that the implement is connected to a three point lifting device, although the described embodiment is a preferred embodiment. Also, the described lifting devices for the lateral frame beam sections are not necessary and could e.g., be replaced by a simple pull cable, although it will be clear that the described lifting device has many advantages with respect to a simple pull cable.

The lower arms 3, 4 of the three point lifting device are, as stated, telescopically extensible. This is of prime importance for an implement mounted to the front of a tractor, since for such an implement one cannot use the usual break-away mechanism for preventing damage when hitting an obstacle. The extensible arms 3, 4 replace such a break-away mechanism since, when one of the outer work performing elements hits an obstacle, the whole implement will rock about an axis defined by a line through the outer end of the upper arm 2 and the outer end of the arm closest to the obstacle (the arm 3 in FIG. 3). The connections of these arms with the implement tolerate, within limits, movements in all directions, so that the part of the implement hitting the obstacle can rock rearwardly around said axis and the opposite part of the implement will at the same time rock forwardly. When rocking about said axis, the lower part of the work performing elements also moves forwardly with respect to their normal position (FIG. 4) so that the position of the work performing elements and especially their ground supports becomes more favourable for sliding over the obstacle. After passing the obstacle, the implement returns by its own weight to its normal position and simultaneously moves the extended rod 4 into its normal retracted position.

I claim:

1. An agricultural implement hving a substantially horizontal frame beam extending tranversely to the direction of movement of the implement and comprising a plurality of frame beam sections, said frame beam sections having work performing elements thereon having crop or ground engaging ends such as rotary mowing elements, said crop or ground ends of the work performing elements being disposed at a substantial distance from and below said frame sections, arms extending obliquely downwardly from the adjacent ends of adjacent ones of said frame sections and pivotal connections on said arms to connect pivotally said frame beam sections, said pivotal connections of the frame beam sections being disposed from said frame beam sections by approximately said substantial distance and located at substantially the level of the crop or ground engaging ends of the work performing element so that the work performing elements will follow surface undulations of the field being worked without change in the spacing between adjacent work performing elements on said adjacent end of said frame beam sections during mutual pivotal movements of said sections.

2. Agricultural implement according to claim characterized in that said horizontal frame beam carries a pair of said work performing elements and wherein the said elements each rotate toward each other at the front of the implement.

3. Agricultural implement according to claim 3, and a shear-off safety device mutually connecting both work performing elements of the intermediate frame beam sections, means for separately driving each of said elements by the tractor, and each of said elements being drivingly connected to said outwardly adjacent further crop working elements.

4. Agricultural implement according to claim 1 in which the said work performing elements each comprise a rotary, conical flange carrying cutters, and a ground support mounted under said flange, characterised in that the pivot connecting two successive frame beam sections is located in the area between two adjacent conical flanges.

5. Agricultural implement according to claim 1 characterized in that the frame beam is composed of three sections, the middle section of which is connectable to the lifting device of an agricultural tractor.

6. Agricultural implement according to claim 5, characterized in that the implement is arranged for mounting on an agricultural tractor, said tractor having a front end and said implement mounted on said front end.

7. Agricultural implement according to claim 5, characterized in that the outer frame beam sections can be lifted by power devices such as hydraulic rams mounted between said sections and the intermediate frame beam section.

8. Agricultural implement according to claim 7, characterized in that successive frame beam parts have ends and are connected by arms which are obliquely downwardly directed from said ends of the frame beam parts and are connected to each other for vertical pivotal movement, the obliquely downwardly directed arm connected to the intermediate frame beam section is pivotally connected to said section for vertical pivotal movement and comprises an upstanding part which is engaged by the power device and which is also connected to the outwardly next frame beam section.

9. Agricultural implement according to claim 8. characterized in that the upstanding part has stroke limited in both directions and there is a limited amount of play in both directions of the connection of the upstanding part with the outwardly next frame beam section.

10. Agricultural implement according to claim 9, in which the inward stroke of the upstanding part has two different end positions, namely a first end position in which the outwardly adjacent frame beam sections can be lifted free from the ground, and a second end position in which said frame beam section can be lifted to an almost vertical position.

11. Agricultural implement according to claim 10, in which the power device is a hydraulic ram, characterized in that a pivoting latch is connected to the cylinder of the ram so as to be positionable between the cylinder and the piston rod of the ram for limiting said first mentioned end position.

12. Agricultural implement according to claim 11, characterized in that the power device, formed by a hydraulic cylinder and said pivoting latch is coupled to the hydraulic lifting device of the tractor whereby after reaching said first or said second end position of the outer frame beam section, further pressure increase of the hydraulic ram lifting device of the tractor causes lifting of the intermediate frame beam section.

* * * * *